US012604091B2

(12) United States Patent
Lu

(10) Patent No.: US 12,604,091 B2
(45) Date of Patent: Apr. 14, 2026

(54) VIDEO RECORDING METHOD AND ELECTRONIC DEVICE

(71) Applicant: VIVO MOBILE COMMUNICATION CO., LTD., Guangdong (CN)

(72) Inventor: Junli Lu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 416 days.

(21) Appl. No.: 18/318,145

(22) Filed: May 16, 2023

(65) Prior Publication Data

US 2023/0308752 A1       Sep. 28, 2023

Related U.S. Application Data

(63) Continuation of application No. PCT/CN2021/130157, filed on Nov. 11, 2021.

(30) Foreign Application Priority Data

Nov. 18, 2020     (CN) .......................... 202011296357.0

(51) Int. Cl.
*H04N 23/667*          (2023.01)
*H04N 23/13*           (2023.01)
(Continued)

(52) U.S. Cl.
CPC ........... *H04N 23/667* (2023.01); *H04N 23/13* (2023.01); *H04N 23/617* (2023.01); *H04N 23/633* (2023.01)

(58) Field of Classification Search
CPC ...... H04N 5/76; H04N 5/2625; H04N 23/631; H04N 23/62; H04N 5/772; H04N 5/2624;
(Continued)

(56) References Cited

U.S. PATENT DOCUMENTS

2012/0201519 A1     8/2012   Reynolds et al.
2017/0278546 A1*    9/2017   Xiao ...................... H04N 5/911
(Continued)

FOREIGN PATENT DOCUMENTS

CN          103002207 A       3/2013
CN          105519095 A       4/2016
(Continued)

OTHER PUBLICATIONS

Extended European Search Report for Application No. 21893820.7, dated Mar. 22, 2024, 9 Pages.
(Continued)

*Primary Examiner* — Xi Wang
(74) *Attorney, Agent, or Firm* — BROOKS KUSHMAN P.C.

(57)                    ABSTRACT
This application discloses a video recording method and an electronic device, and pertains to the field of video processing technologies. The video recording method includes: receiving, during recording of a first video based on a first recording property, a first input for a shooting preview screen corresponding to the first video; in response to the first input, obtaining a second recording property; and recording a second video based on the second recording property while retaining the recording of the first video based on the first recording property.

16 Claims, 14 Drawing Sheets

(51) Int. Cl.
| | |
|---|---|
| *H04N 23/617* | (2023.01) |
| *H04N 23/63* | (2023.01) |

(58) Field of Classification Search
CPC .. H04N 5/2621; H04N 23/633; H04N 23/617; H04N 23/13; H04N 23/667; G11B 27/34; G11B 27/031; G06F 3/04886; G06F 3/0482

See application file for complete search history.

(56) References Cited

U.S. PATENT DOCUMENTS

| | | | |
|---|---|---|---|
| 2018/0270420 A1 | 9/2018 | Lee et al. | |
| 2019/0141307 A1 | 5/2019 | Youn et al. | |
| 2020/0186728 A1 | 6/2020 | Pena | |
| 2020/0336661 A1 | 10/2020 | Zhang et al. | |
| 2020/0412952 A1 | 12/2020 | Hao | |
| 2020/0412976 A1 | 12/2020 | Hao | |
| 2021/0006715 A1 | 1/2021 | Hao | |
| 2023/0103098 A1* | 3/2023 | Nakata | H04N 5/2628 348/36 |

FOREIGN PATENT DOCUMENTS

| | | | |
|---|---|---|---|
| CN | 107786827 | A | 3/2018 |
| CN | 108616696 | A | 10/2018 |
| CN | 108900771 | A | 11/2018 |
| CN | 109451245 | A | 3/2019 |
| CN | 110113526 | A | 8/2019 |
| CN | 110784774 | A | 2/2020 |
| CN | 111147779 | A | 5/2020 |
| CN | 111554278 | A | 8/2020 |
| CN | 112422846 | A | 2/2021 |
| JP | H11271593 | A | 10/1999 |
| JP | 2007150444 | A | 6/2007 |
| JP | 2007259155 | A | 10/2007 |
| JP | 2013058921 | A | 3/2013 |
| JP | 2020184362 | A | 11/2020 |
| KR | 20180106076 | A | 10/2018 |
| KR | 101915036 | B1 | 11/2018 |
| KR | 20190051594 | A | 5/2019 |
| WO | 2020015331 | A1 | 1/2020 |
| WO | 2020055613 | A1 | 3/2020 |

OTHER PUBLICATIONS

First Japanese Office Action for Japanese Application No. 2023-530017 mailed Aug. 8, 2024. 8 pages.

Second Japanese Office Action for Japanese Application No. 2023-530017 mailed Feb. 27, 2025. 6 pages.

First Korean Office Action for Korean Patent Application No. 10-2023-7019884 mailed May 29, 2025. 14 pages.

First Office Action for Chinese Application No. 202011296357.0, dated Mar. 7, 2022, 6 Pages.

International Search Report and Written Opinion for Application No. PCT/CN2021/130157, dated Jan. 26, 2022, 10 Pages.

Third Japanese Office Action for Japanese Patent Application No. 2023-530017 mailed Sep. 2, 2025. 6 pages.

\* cited by examiner

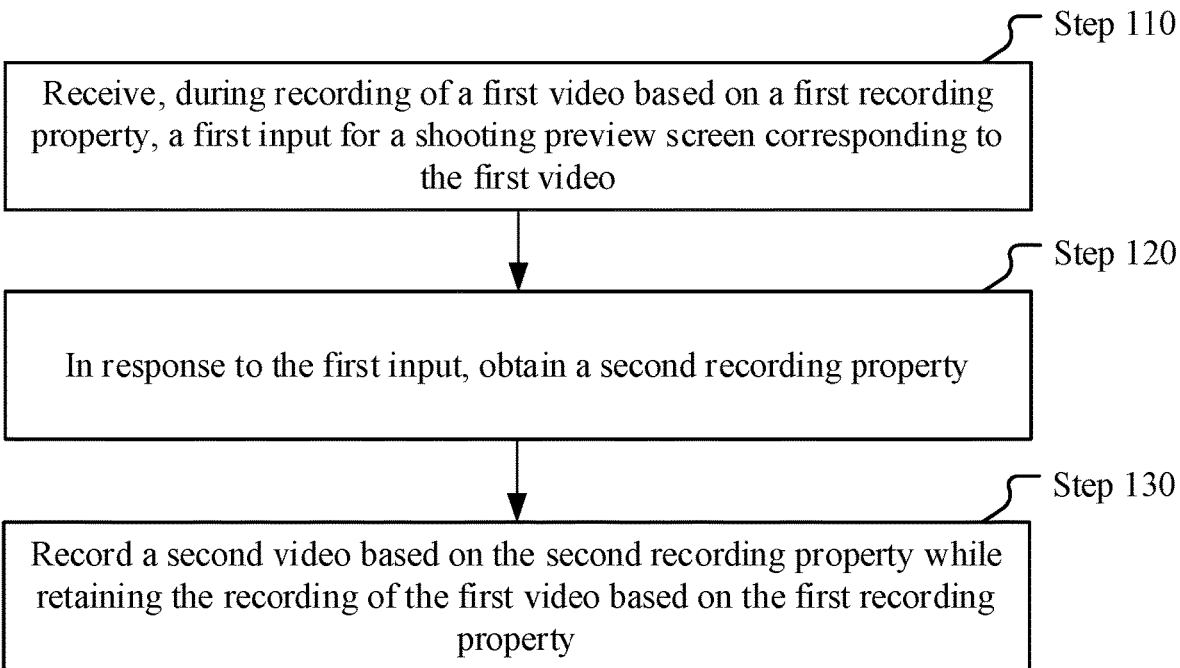

Step 110

Receive, during recording of a first video based on a first recording property, a first input for a shooting preview screen corresponding to the first video Step 120

In response to the first input, obtain a second recording property

Step 130

Record a second video based on the second recording property while retaining the recording of the first video based on the first recording property

FIG. 1a

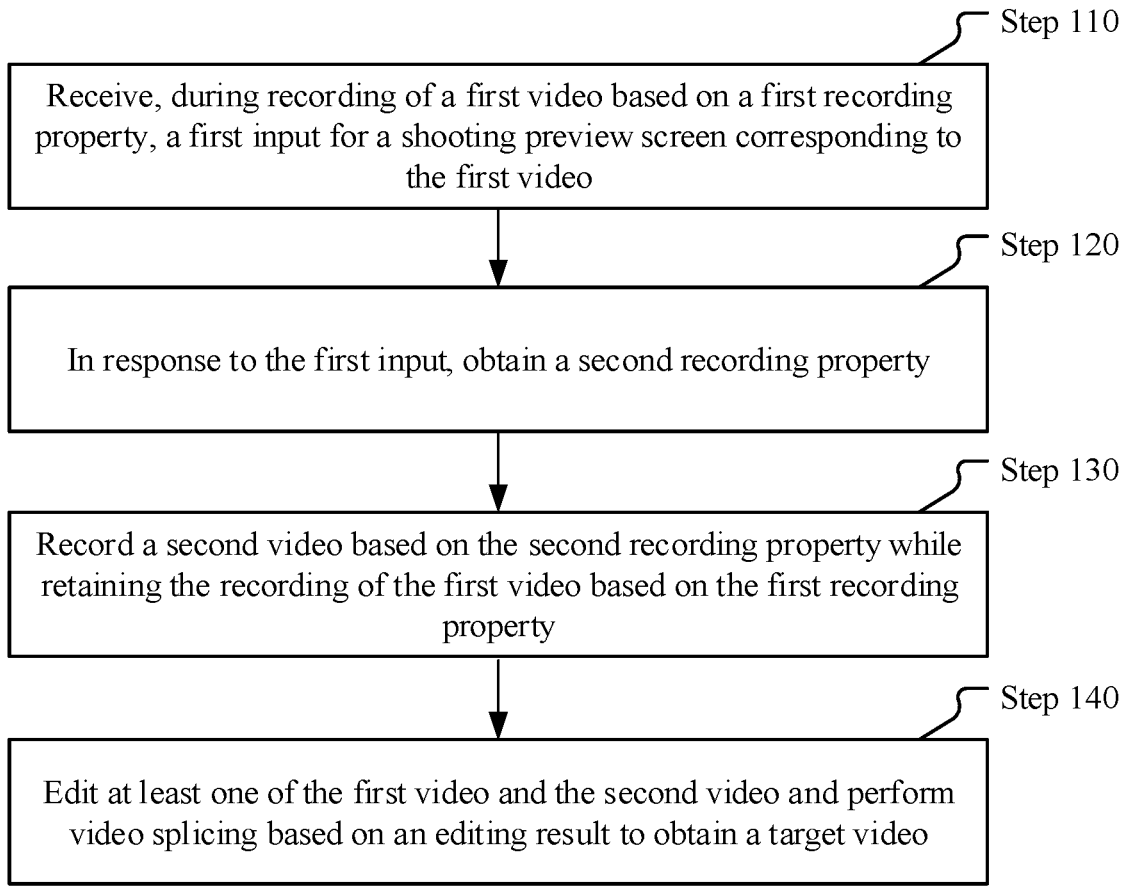

Step 110

Receive, during recording of a first video based on a first recording property, a first input for a shooting preview screen corresponding to the first video Step 120

In response to the first input, obtain a second recording property

Step 130

Record a second video based on the second recording property while retaining the recording of the first video based on the first recording property Step 140

Edit at least one of the first video and the second video and perform video splicing based on an editing result to obtain a target video

FIG. 2a

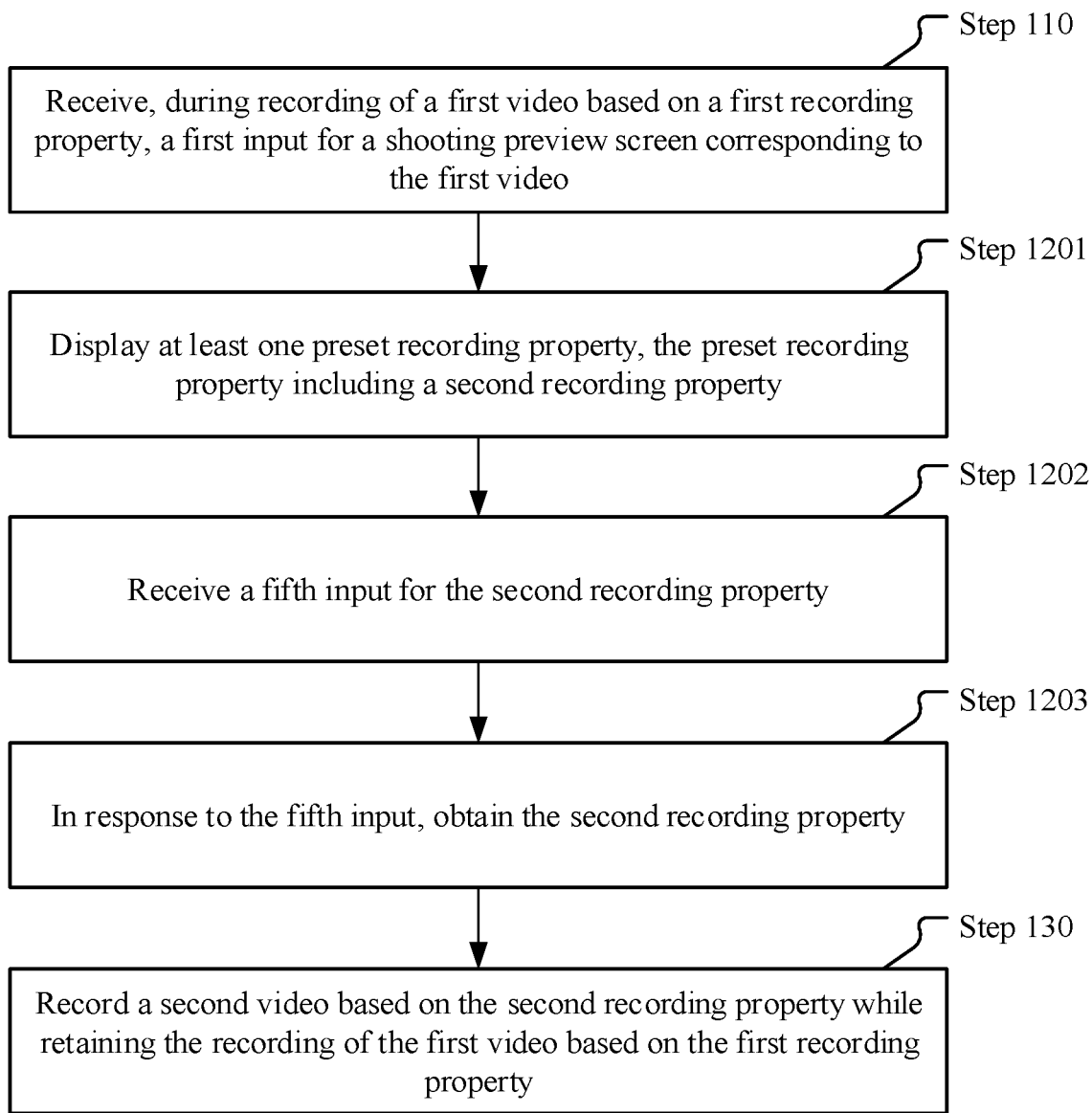

Step 110

Receive, during recording of a first video based on a first recording property, a first input for a shooting preview screen corresponding to the first video Step 1201

Display at least one preset recording property, the preset recording property including a second recording property Step 1202

Receive a fifth input for the second recording property

Step 1203

In response to the fifth input, obtain the second recording property

Step 130

Record a second video based on the second recording property while retaining the recording of the first video based on the first recording property

FIG. 3a

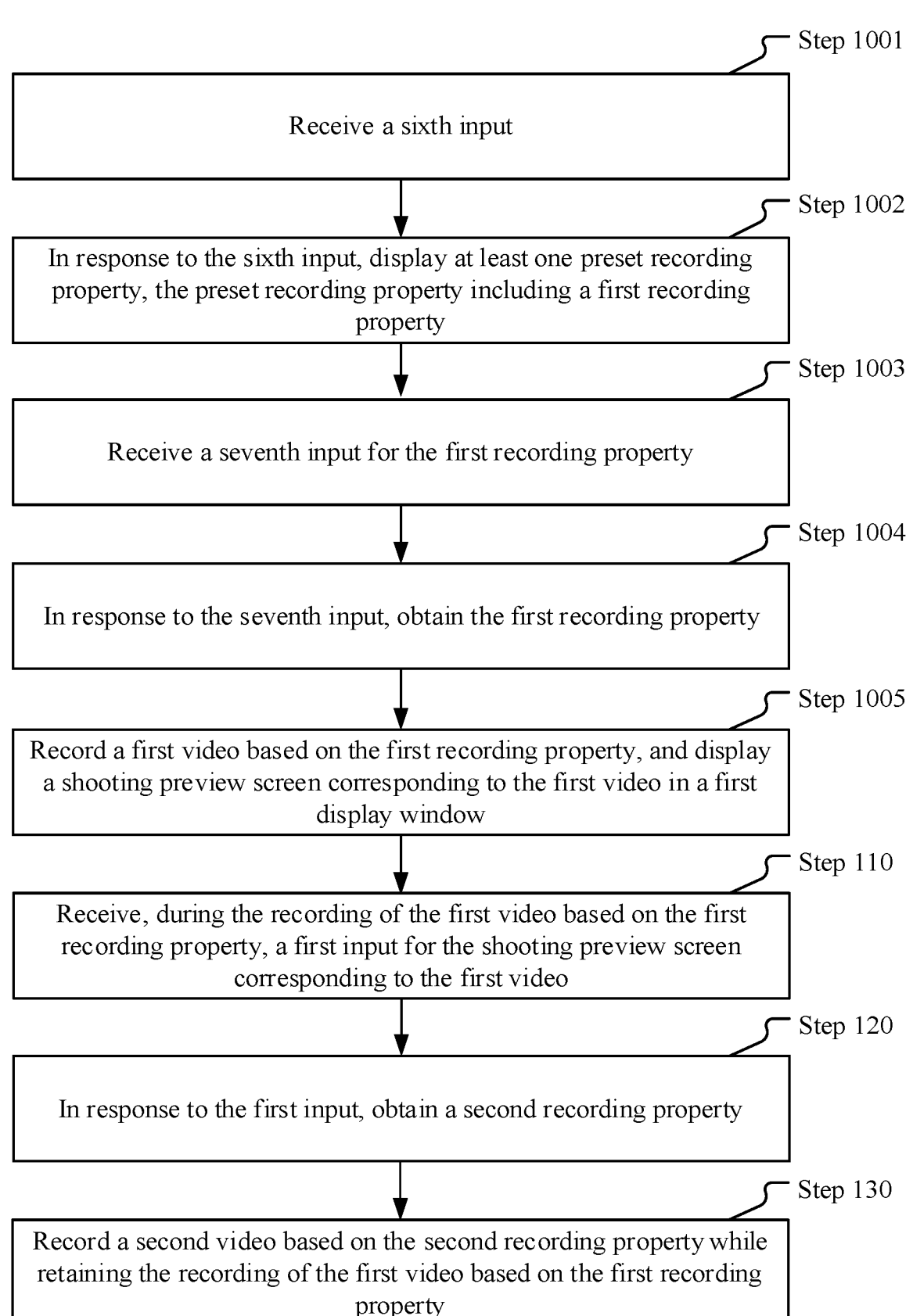

Step 1001

Receive a sixth input

Step 1002

In response to the sixth input, display at least one preset recording property, the preset recording property including a first recording property Step 1003

Receive a seventh input for the first recording property

Step 1004

In response to the seventh input, obtain the first recording property

Step 1005

Record a first video based on the first recording property, and display a shooting preview screen corresponding to the first video in a first display window Step 110

Receive, during the recording of the first video based on the first recording property, a first input for the shooting preview screen corresponding to the first video Step 120

In response to the first input, obtain a second recording property

Step 130

Record a second video based on the second recording property while retaining the recording of the first video based on the first recording property

FIG. 4a

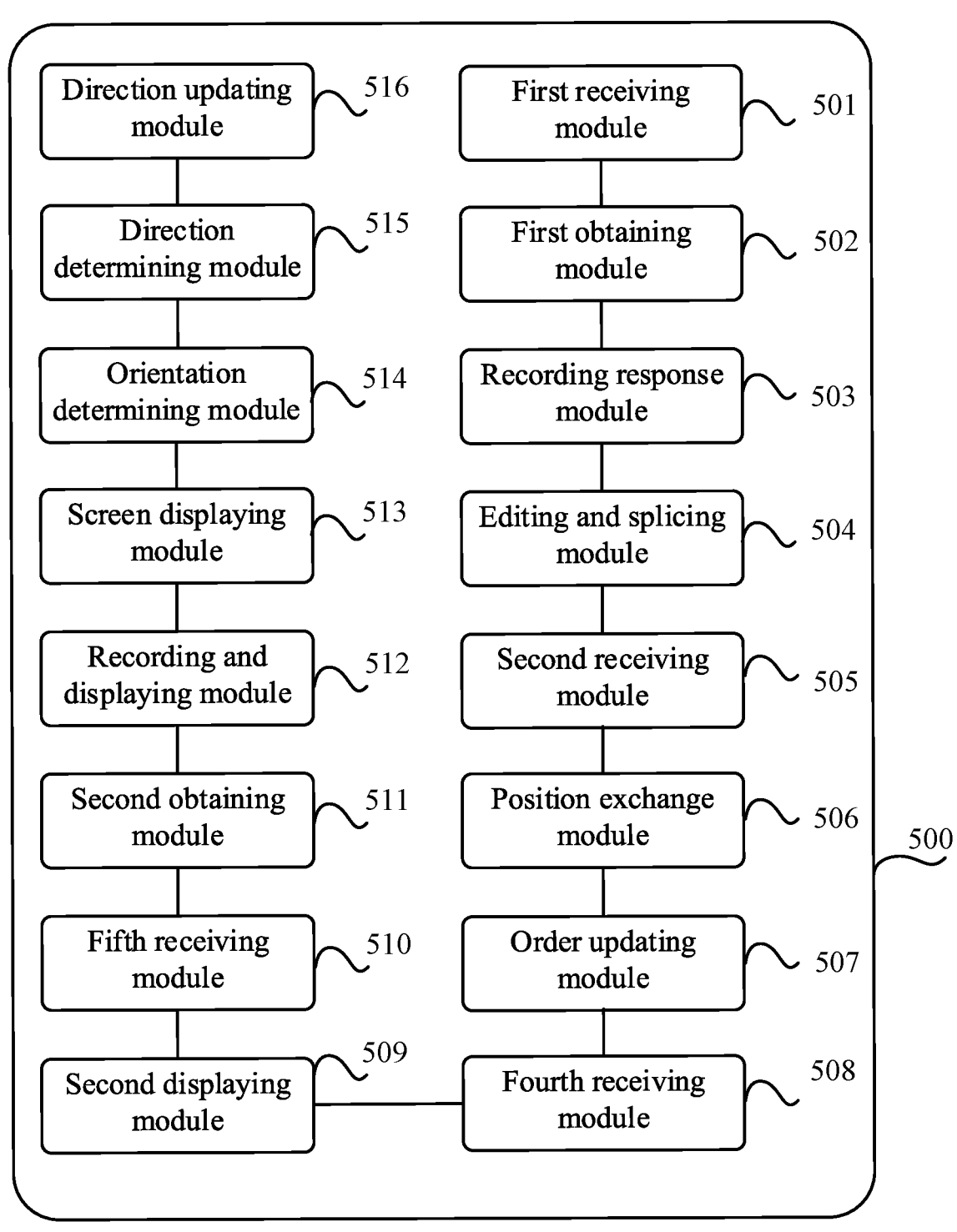

Direction updating module — 516

Direction determining module — 515

Orientation determining module — 514

Screen displaying module — 513

Recording and displaying module — 512

Second obtaining module — 511

Fifth receiving module — 510

Second displaying module — 509

First receiving module — 501

First obtaining module — 502

Recording response module — 503

Editing and splicing module — 504

Second receiving module — 505

Position exchange module — 506

Order updating module — 507

Fourth receiving module — 508

VIDEO RECORDING METHOD AND ELECTRONIC DEVICE

CROSS-REFERENCE TO RELATED APPLICATIONS

This application is a continuation of PCT International Application No. PCT/CN2021/130157 filed on Nov. 11, 2021, which claims priority to Chinese patent application No. 202011296357.0, filed on Nov. 18, 2020 and entitled "VIDEO RECORDING METHOD AND ELECTRONIC DEVICE", which are incorporated herein by reference in their entireties.

TECHNICAL FIELD

This application pertains to the field of video processing technologies, and specifically, relates to a video recording method and an electronic device.

BACKGROUND

With the continuous development of video processing technologies, more and more recording properties are available for users to do video recording. Different video recording properties can bring different video shooting experience to users. Therefore, how video shooting effects can be diversified has become one of key problems to enhance the shooting experience of users.

In the prior art, monotonous video recording properties are provided. Even if there are a plurality of video recording properties available for the user, because different properties are mutually exclusive, video shooting can only be performed under one video recording property at a time. To switch to another video recording property to do video recording, the user needs to end the current recording process, switch to that video recording property, and then start a new recording process.

In the implementation of this application, the inventor has found at least the following problems exist in the prior art: First, because video shooting can only be performed under one video recording property at a time, the video shooting effect is monotonous, and second, the existing process of switching video recording properties is cumbersome, which easily leads to missing of important moments in the switching process, thus degrading the video shooting experience of the user.

SUMMARY

According to a first aspect, an embodiment of this application provides a video recording method, where the method includes:

receiving, during recording of a first video based on a first recording property, a first input for a shooting preview screen corresponding to the first video;

in response to the first input, obtaining a second recording property; and recording a second video based on the second recording property while retaining the recording of the first video based on the first recording property.

According to a second aspect, an embodiment of this application provides a video recording apparatus, where the apparatus includes:

a first receiving module configured to receive, during recording of a first video based on a first recording property, a first input for a shooting preview screen corresponding to the first video;

a first obtaining module configured to, in response to the first input, obtain a second recording property; and a recording response module configured to record a second video based on the second recording property while retaining the recording of the first video based on the first recording property.

According to a third aspect, an embodiment of this application provides an electronic device, where the electronic device includes a processor, a memory, and a program or instructions stored in the memory and capable of running on the processor, and when the program or instructions are executed by the processor, the steps of the video recording method according to the first aspect are implemented.

According to a fourth aspect, an embodiment of this application provides a readable storage medium, where the readable storage medium stores a program or instructions, and when the program or instructions are executed by a processor, the steps of the video recording method according to the first aspect are implemented.

According to a fifth aspect, an embodiment of this application provides a chip. The chip includes a processor and a communication interface, where the communication interface is coupled to the processor, and the processor is configured to run a program or instructions to implement the video recording method according to the first aspect.

According to a sixth aspect, an embodiment of this application provides an electronic device, configured to perform the steps of the video recording method according to the first aspect.

According to a seventh aspect, an embodiment of this application provides a computer program product, where the program product can be executed by a processor to implement the steps of the video recording method according to the first aspect.

BRIEF DESCRIPTION OF THE DRAWINGS

FIG. 1a is a flowchart of a video recording method according to an exemplary embodiment;

FIG. 2a is a flowchart of another video recording method according to an exemplary embodiment;

FIG. 3a is a flowchart of still another video recording method according to an exemplary embodiment;

FIG. 4a is a flowchart of yet another video recording method according to an exemplary embodiment;

FIG. 5 is a structural block diagram of a video recording apparatus according to an exemplary embodiment;

DETAILED DESCRIPTION

Figure 1B:
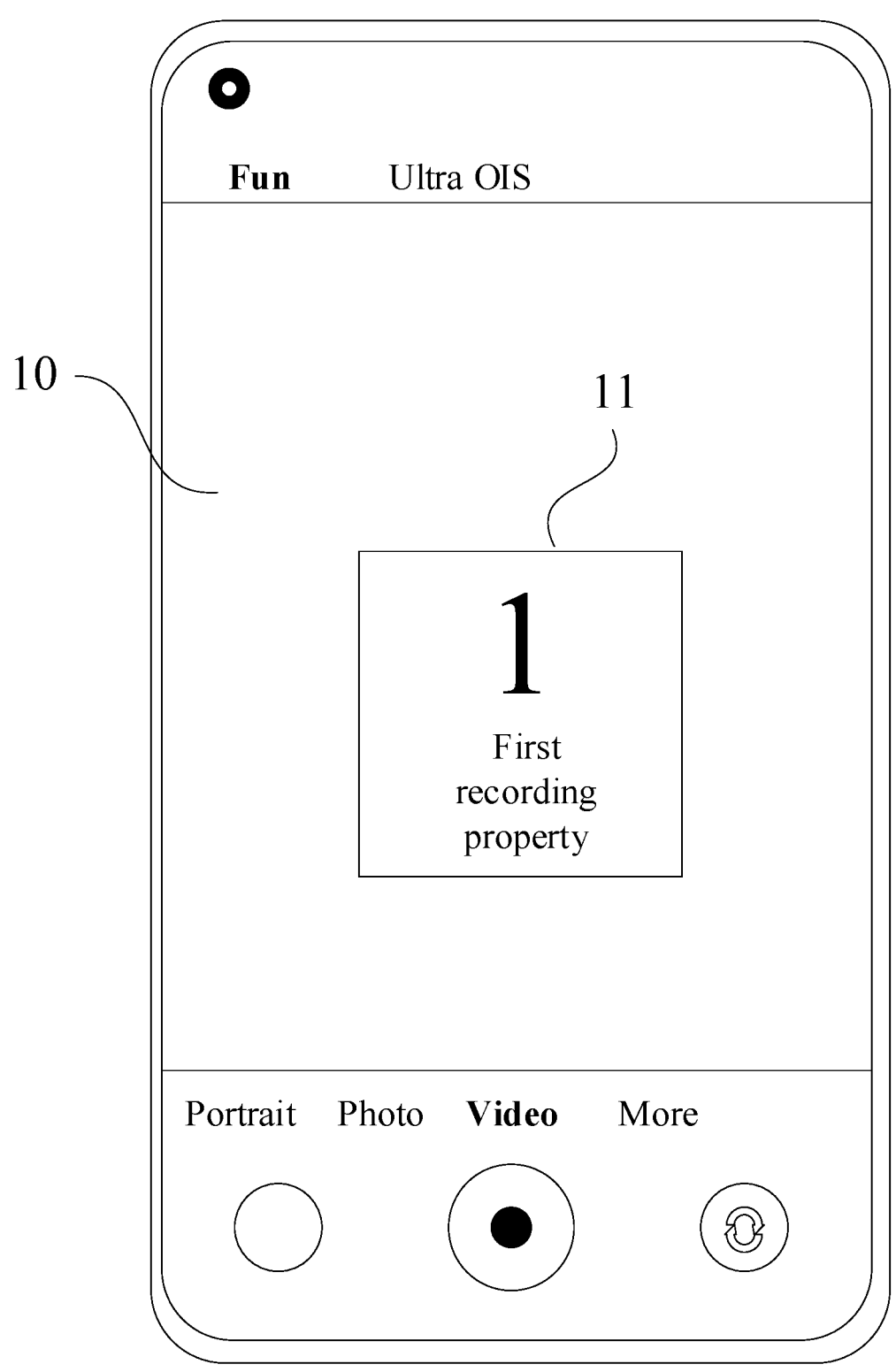
FIG. 1b is a schematic diagram of a video recording screen according to an exemplary embodiment.

The following clearly describes the technical solutions in the embodiments of this application with reference to the accompanying drawings in the embodiments of this application. Apparently, the described embodiments are only some but not all of the embodiments of this application. All other embodiments obtained by persons of ordinary skill in the art based on the embodiments of this application without creative efforts shall fall within the protection scope of this application.

The terms "first", "second", and the like in the specification and claims of this application are used to distinguish between similar objects rather than to describe a specific order or sequence. It should be understood that terms used in this way are interchangeable in appropriate circumstances such that the embodiments of this application can be implemented in other orders than the order illustrated or described herein. In addition, objects distinguished by "first", "second", and the like are generally of a same type, and the quantities of the objects are not limited, for example, there may be one or more first objects. In addition, in the specification and claims, "and/or" indicates at least one of the connected objects, and the character "/" generally indicates an "or" relationship between the contextually associated objects.

The following describes in detail a video recording method and an electronic device provided in the embodiments of this application through specific embodiments and application scenarios thereof with reference to the accompanying drawings.

The video recording method provided in the embodiments of this application can be applied to scenarios where video shooting is performed by using an electronic device supporting a plurality of video recording properties, for example, where video shooting is performed by using a fun shooting function on a mobile phone. Herein, the recording properties involved in the embodiments of this application include but are not limited to video recording mode, video recording parameter, lens zoom factor, and lens type. In the prior art, different video recording properties on one electronic device are mutually exclusive, that is, video recording can only be performed under one video recording property at a time when the electronic device is used for the video recording. To switch to another video recording property to do video recording, a user needs to end the current recording process, switch to that video recording property, and then start a new recording process.

In view of the foregoing, an embodiment of this application provides a video recording method, by which during recording of a first video based on a first recording property, a second video can be recorded for the same shooting scene based on a second recording property in response to a first input by a user, with the recording of the first video based on the first recording property retained. In this way, the user can start video recording based on the desired recording property in a timely manner to fit actual shooting scene requirements. When the recording is ended, the user can obtain videos recorded under different recording properties at the same time, thereby diversifying the video recording effects, providing the user with more choices in later video editing. In addition, the user can switch recording properties without ending the video recording process, so no shooting moment will be missed, which enhances the shooting experience of the user while simplifying the switch operation.

Certainly, in addition to the recording of the first video based on the first recording property and the recording of the second video based on the second recording property, the embodiments of this application may also be extended to recording of other more videos based on other recording properties. To be specific, during the recording of the first video and the second video, other videos are recorded based on other recording properties in response to specific inputs by the user, with the recording of the first video and the second video retained, and so on. Details are not described herein.

Based on the foregoing application scenario, the following describes in detail the video recording method provided in embodiments of this application with reference to FIG. 1a to FIG. 4e.

FIG. 1a is a flowchart of a video recording method according to an exemplary embodiment.

As shown in FIG. 1a, the video recording method may specifically include the following steps.

Step 110. Receive, during recording of a first video based on a first recording property, a first input for a shooting preview screen corresponding to the first video.

Step 120. In response to the first input, obtain a second recording property.

Step 130. Record a second video based on the second recording property while retaining the recording of the first video based on the first recording property.

As such, the second video is recorded based on the second recording property during the recording of the first video based on the first recording property, so videos with different shooting effects can be obtained according to requirements of the user, thereby diversifying the video recording effects, providing the user with more choices. In addition, automatic switching of recording properties can be implemented by receiving the first input by the user for the first video with no need to end the video recording process, so every moment can be recorded, which enhances the shooting experience of the user while simplifying the switch operation.

The following describes in detail the foregoing steps specifically as follows.

In step 110, when the user makes a first input for the shooting preview screen corresponding to the first video in case of recording the first video based on the first recording property, the first input is received.

In some embodiments, the first recording property may be one of video recording modes, for example, normal mode, slow motion mode, AR shooting mode, time-lapse mode, and user-defined recording mode. The first recording property may alternatively be one of video recording parameters, for example, brightness a, chroma b, contrast c, and a user-defined recording parameter value. The first recording property may alternatively be one of lens zoom factors, for example, zoom in by two times, zoom in by ten times, and zoom out by two times. In addition, the first recording property may alternatively be one of lens types, for example, main camera and wide-angle camera.

In some embodiments, the first video may be a video that is the first to be recorded after a camera mode of an electronic device is started or a video that is recorded in case of recording a video based on another recording property. Correspondingly, the first recording property may be a default recording property of the system or a recording property selected by the user, which is not limited herein.

In addition, as shown in FIG. 1*b*, the shooting preview screen corresponding to the first video may be displayed in a main preview screen 10 and/or a first display window 11. The first display window 11 may be semi-transparently suspended above the main preview screen 10.

Correspondingly, the first input by the user for the shooting preview screen corresponding to the first video may be an operation with which the user triggers popup of a property menu by tapping the shooting preview screen and selects the second recording property in the property menu or a slide operation by the user based on an input characteristic corresponding to the second recording property, which is not limited herein.

In step 120 and step 130, similarly, the second recording property may be one of video recording modes, one of video recording parameters, one of lens zoom factors, or one of lens types. The second recording property differs from the first recording property, leading to different video recording effects presented by the second video recorded based on the second recording property and the first video recorded based on the first recording property.

Based on this, after the first input by the user for the shooting preview screen corresponding to the first video is received, the recording of the first video based on the first recording property is not stopped. That is, the second recording property can be selected, and the second video can be recorded based on the second recording property with the recording of the first video based on the first recording property retained. In this way, seamless switch between recording properties is implemented, and videos with different effects recorded based on different recording properties can be obtained for a same shooting scene, which can be provided for selection by the user for later editing, enhancing the user experience.

Figure 1C:
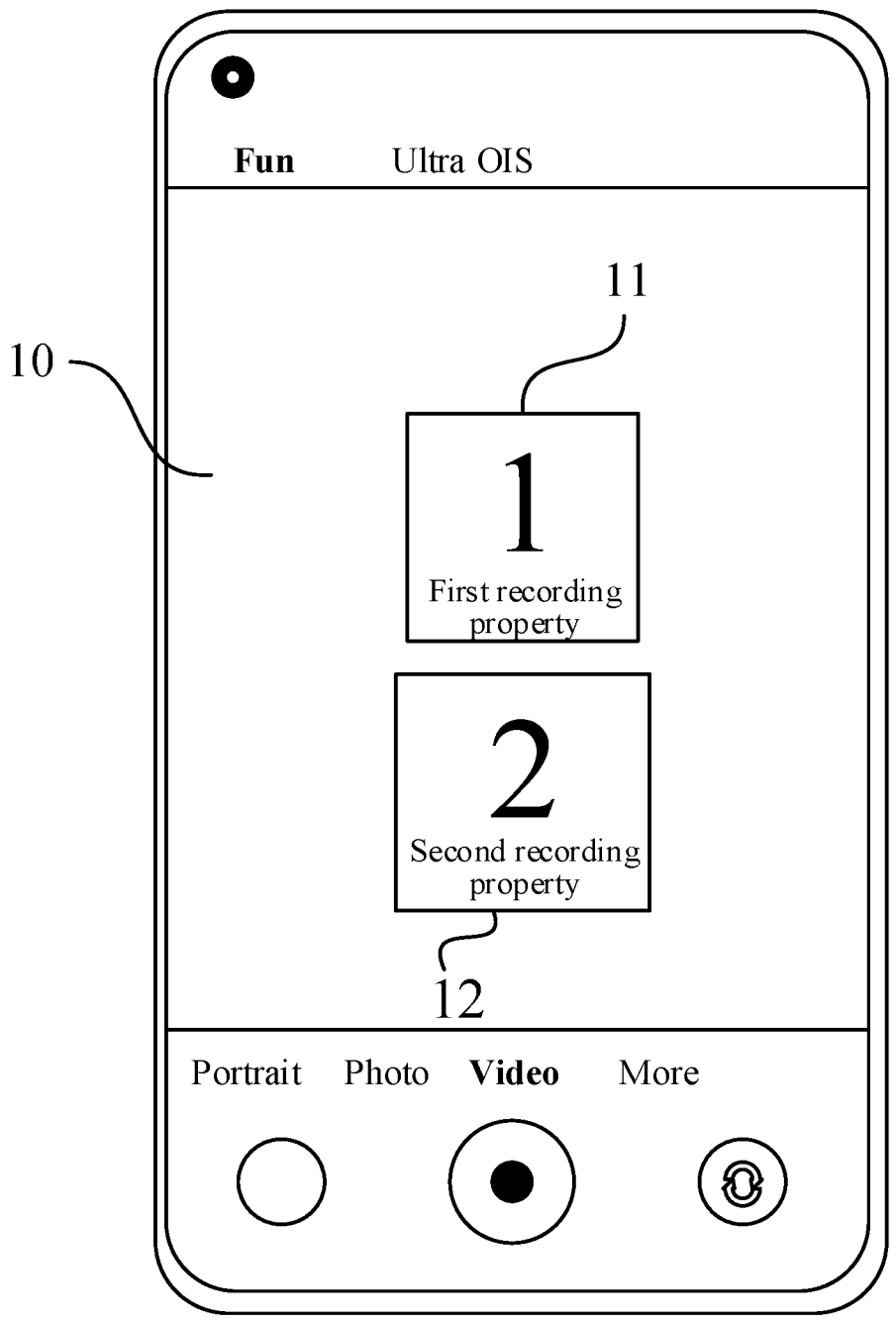
FIG. 1c is a schematic diagram of another video recording screen according to an exemplary embodiment.

In addition, when the second video is being recorded based on the second recording property with the recording of the first video based on the first recording property retained, as shown in FIG. 1*c*, the shooting preview screen corresponding to the first video may be displayed in the first display window 11, and a shooting preview screen corresponding to the second video may be displayed in the main preview screen 10 and/or a second display window 12.

To further process the recorded first video and second video, in addition to the foregoing steps 110 to 130, in some possible embodiments, as shown in FIG. 2*a*, after step 130, the video recording method provided in the embodiments of this application may further include the following step.

Step 140. Edit at least one of the first video and the second video and perform video splicing based on an editing result to obtain a target video.

Herein, the target video may be a new video generated after at least one of the first video and the second video that are recorded is edited and spliced. The editing and splicing process may be completed automatically by the device by default or completed in a user-defined manner, which is not limited herein.

In this way, after the videos are recorded, the recorded videos with different effects can be edited and spliced together with no need to rely on third-party software, so that the target video generated can include video clips with different recording effects, making video recording more interesting while reducing later video processing time of the user, thus enhancing the user experience.

In some implementations, the video editing and splicing process may be completed automatically by the device by default. Correspondingly, the editing at least one of the first video and the second video and performing video splicing based on an editing result to obtain a target video may specifically include:

> obtaining a recording start time point corresponding to the second video;
>
> editing, according to the recording start time point, the first video to obtain a target video clip, where the target video clip is a video clip in which the first video and the second video do not overlap in video recording time; and
>
> splicing, according to a recording property application order, the target video clip with the second video to obtain the target video.

Herein, the recording start time point corresponding to the second video may be a time point at which the recording of the second video based on the second recording property is started. Correspondingly, the recording property application order may be an order obtained by arranging recording start time points of the videos.

For example, the first video and the second video may be spliced to form a complete video, that is, the target video, in an order of the first video before the second video by default. The time point for splicing is a point of switching between the two recording properties, that is, the recording start time point corresponding to the second video. For example, in the case of switching from the first recording property to the second recording property, the recording start time point of the second video is used as the splicing point of the first video and the second video although the first video continues to be recorded after that point, and an overlap part of the first video that with the second video is directly cut away, with the video clip in which the first video and the second video do not overlap in recording time left. That video clip left is the target video clip. Then, the target video clip and the second video are spliced to form a new video. Similarly, in the case of video recording based on more than three recording properties, cutting of a plurality of videos and splicing of video clips can also be performed automatically. Certainly, when the target video is generated, a complete recording result corresponding to each video can be stored separately for use in other video processing.

In this way, the user does not need to use any third-party software, and the device can automatically edit and splice the recorded videos with different effects, so the later video processing time of the user can be greatly reduced, and satisfactory videos can be produced by making full use of different recording properties according to different shooting scenes, thereby enhancing the user experience.

In some implementations, the video editing and splicing process may be completed in a user-defined manner. Correspondingly, the editing at least one of the first video and the second video and performing video splicing based on an editing result to obtain a target video may specifically include:

> receiving a second input for the first video; in response to the second input, editing the first video to obtain a first video clip; and splicing, according to a recording property application order, the first video clip with the second video to obtain the target video; or
>
> receiving a third input for the second video; in response to the third input, editing the second video to obtain a second video clip; and splicing, according to a recording property application order, the first video with the second video clip to obtain the target video; or
>
> receiving a second input for the first video and a third input for the second video; in response to the second input, editing the first video to obtain a first video clip, and in response to the third input, editing the second video to obtain a second video clip; and splicing, according to a recording property application order, the first video clip with the second video clip to obtain the target video.

Herein, the user can freely select an editing time point for each video, which means the user may or may not edit the videos. For more than three video recording results, the user can freely select from the recording results which videos to edit and splice.

It should be noted that in the user-defined manner, the videos to edit and splice may be all or some of the videos in the recording results, which may be determined by the user.

For example, the user may tap to select videos, perform selective splicing and edit the duration of each video for splicing according to personal preferences and scene requirements, and then perform video splicing according to the recording property application order to generate a new video, that is, the target video. Herein, the user may also change the splicing order of the videos, which is not limited herein. Certainly, when the target video is generated, a complete recording result corresponding to each video can be stored separately for use in other video processing.

Figure 2B:
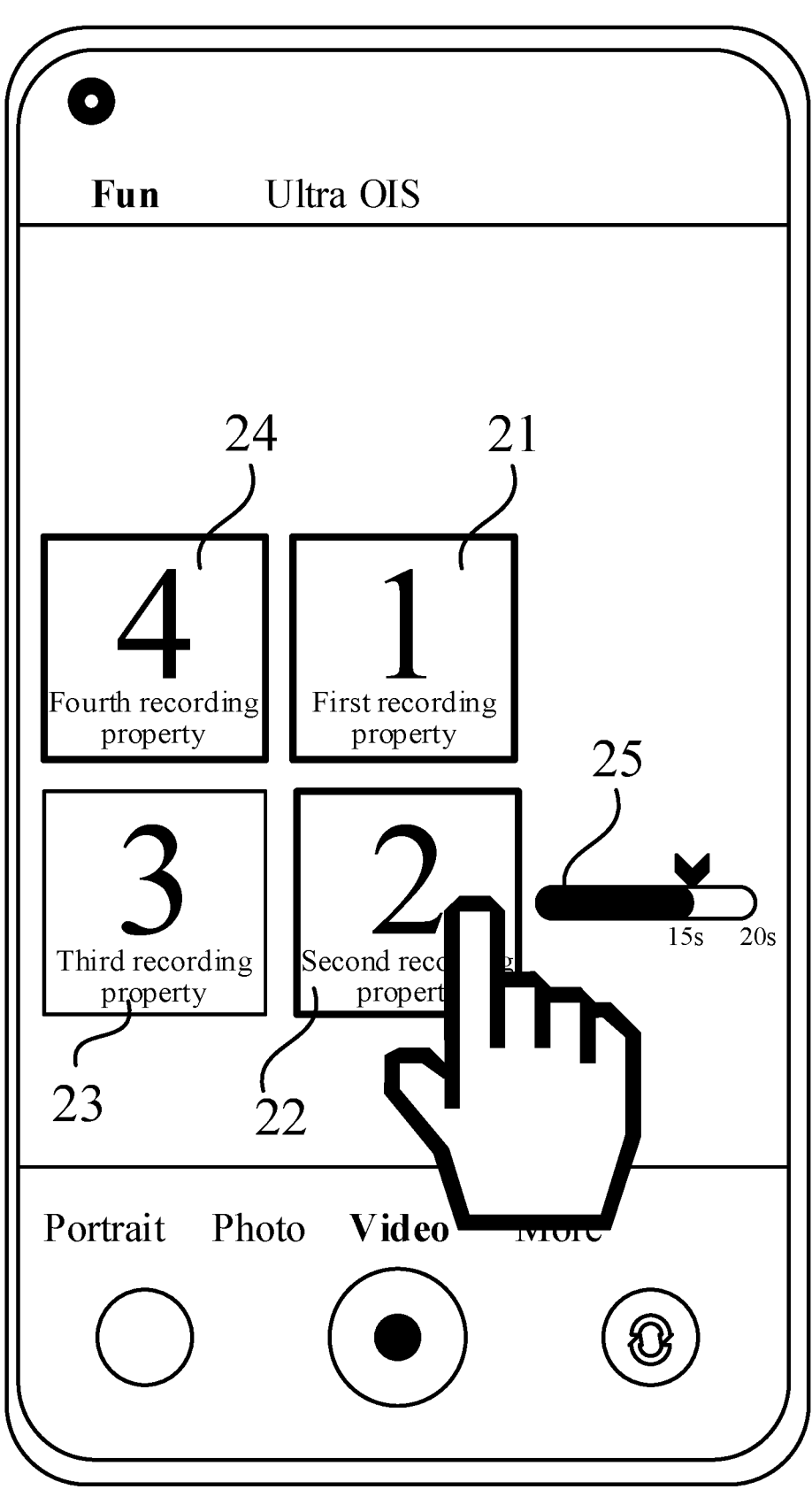
FIG. 2b is a schematic diagram of a video editing screen according to an exemplary embodiment.

A specific example is given. As shown in FIG. 2b, from four video recording results, which are a first video 21, a second video 22, a third video 23, and a fourth video 24, the user can select only the first video 21, the second video 22, and the fourth video 24 for splicing, and edit the duration of each of the videos for splicing according to time point prompt information 25.

In this way, the user can have more autonomous choices, so the recording requirements of the user can be better satisfied with more recording choices provided for the user, further enhancing the user experience.

Based on the foregoing two manners, the user may change the recording property application order before splicing the videos, so as to adjust the splicing order of the videos. Correspondingly, after step 130, the video recording method provided in the embodiments of this application may further include: receiving a fourth input for a first display window corresponding to the first video; in response to the fourth input, adjusting a relative positional relationship between the first display window corresponding to the first video and a display window corresponding to at least one related video, where the display window is used to display a shooting preview screen corresponding to the video; and updating the recording property application order based on an adjusting result.

Herein, during recording of a plurality of videos, the user can update the recording property application order by adjusting positions of the display windows corresponding to the videos, so as to adjust the splicing order of the videos when splicing the videos. When the videos are spliced, the splicing order can be determined according to the position of the display window corresponding to each video. For example, in a case that positions of a third display window corresponding to the third video and the second display window corresponding to the second video are interchanged, the splicing order of the videos is adjusted from the first video—the second video—the third video to the first video—the third video—the second video.

It should be noted that in the user-defined manner, the user may alternatively adjust the positions of the display windows after ending the video recording and before splicing the videos.

Therefore, the user can change the splicing order of the videos at any time based on actual shooting effects, thereby further increasing the autonomous choices made by the user, enhancing the user experience.

In addition, based on the foregoing steps 110 to 130, in a possible embodiment, as shown in FIG. 3a, step 120 may specifically include step 1201 to step 1203 as follows.

Step 1201. Display at least one preset recording property, the preset recording property including the second recording property.

Herein, the preset recording property may include a plurality of recording properties available for the user, for example, may be a plurality of preset modes in the case of video recording mode, a plurality of preset parameters in the case of video recording parameter, a plurality of preset factors in the case of lens zoom factor, or a plurality of preset types in the case of lens type, for which further details are not given herein. Certainly, the preset recording property may further include a plurality of user-defined recording properties.

Figure 3B:
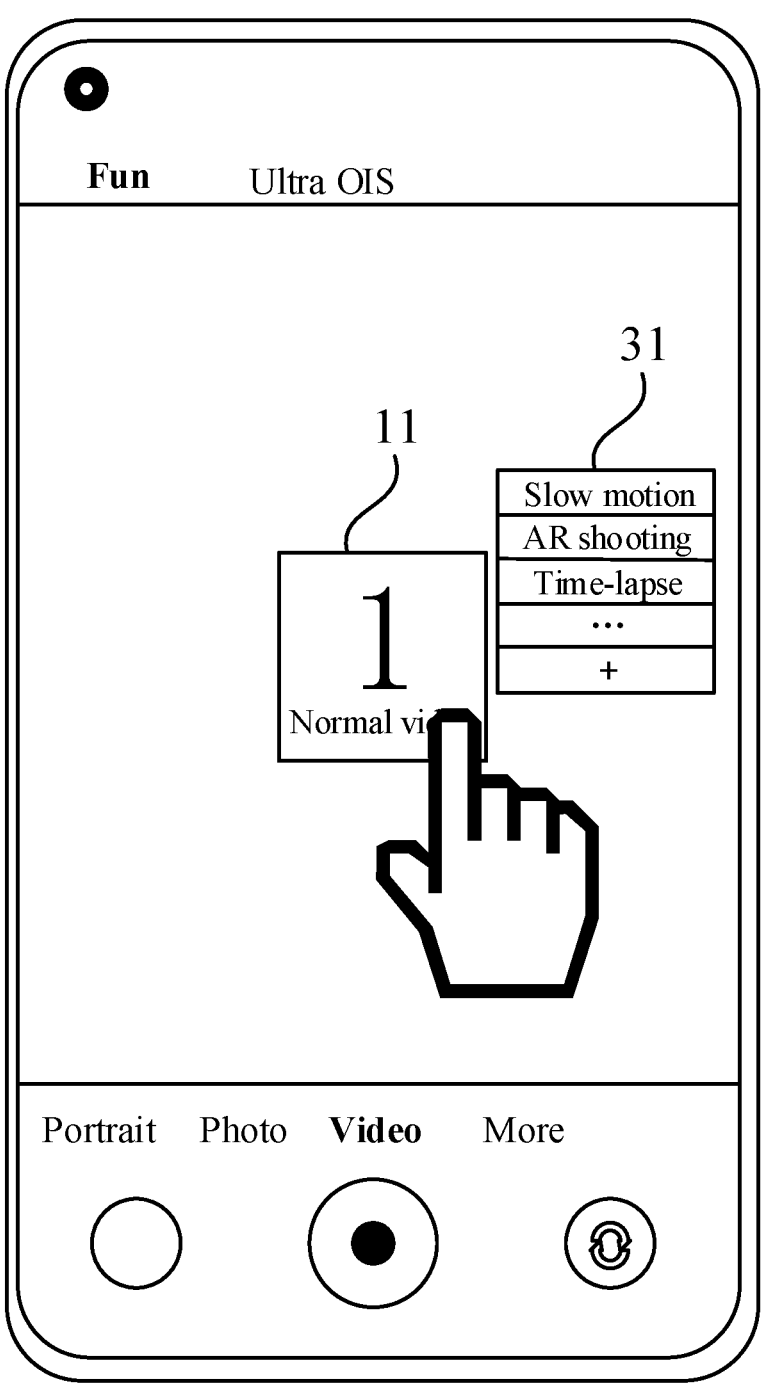
FIG. 3b is a schematic diagram of still another video recording screen according to an exemplary embodiment.

In addition, in some implementations, the at least one preset recording property may be displayed in a menu for selection by the user. For example, as shown in FIG. 3b, the first input may be a touch-and-hold operation by the user on the first display window 11 corresponding to the first video, and after the touch-and-hold operation, a first menu list 31 is displayed on one side of the first display window 11. To avoid repeated selection, at least one other preset recording property than the first recording property may be displayed in the list. For example, in a case that the first recording property is a normal video mode, the recording properties displayed in the first menu list 31 may include slow motion, AR shooting, time-lapse, and the like, and the user may also customize more recording modes by tapping "+" at the end of the menu list.

Step 1202. Receive a fifth input for the second recording property.

Herein, the fifth input may be a tap by the user to select the second recording property displayed or a slide operation by the user based on an input characteristic corresponding to the second recording property, which is not limited herein.

Step 1203. In response to the fifth input, obtain the second recording property.

Herein, the second recording property can be obtained when the user selects an icon corresponding to the second recording property or performs a slide operation based on the input characteristic corresponding to the second recording property.

Therefore, the user can make selection of recording properties more conveniently from the preset recording properties displayed, thus quickly calling up the desired recording property for video recording in the actual shooting scene, further enhancing the shooting experience of the user.

In addition, in a case that the first video is the 1st video recorded this time, meaning there is no other video being recorded before the first video, the system uses the default recording property. The user may switch from the recording property used by the system by default before starting the video recording though. Specifically, in some possible embodiments, as shown in FIG. 4a, before step 110, the video recording method provided in the embodiments of this application may further include step 1001 to step 1005 as follows.

Step 1001. Receive a sixth input.

Herein, before the video recording is started, the user can trigger displaying of at least one preset recording property through the sixth input.

Step 1002. In response to the sixth input, display at least one preset recording property, the preset recording property including the first recording property.

For example, similar to the foregoing method, the sixth input may be a touch-and-hold operation by the user on the first display window, and after the touch-and-hold operation, the first menu list is displayed on one side of the first display window. The list includes at least one preset recording property such as normal video, slow motion, AR shooting, and time-lapse, and the user may also customize more recording modes by tapping "+" at the end of the menu list.

Step 1003. Receive a seventh input for the first recording property.

Herein, the seventh input may be a tap by the user to select the first recording property displayed or a slide operation by the user based on an input characteristic corresponding to the first recording property, which is not limited herein.

Step 1004. In response to the seventh input, obtain the first recording property.

Herein, when the user selects an icon corresponding to the first recording property or performs a slide operation based on the input characteristic corresponding to the first recording property, the first recording property can be obtained.

Step 1005. Record the first video based on the first recording property, and display the shooting preview screen corresponding to the first video in a first display window.

Therefore, before starting the video recording, the user can select the first recording property that needs to be used first by triggering displaying of the preset recording properties, so as to switch from the recording property used by the system by default and record the first video, thereby improving the flexibility of selection of recording properties by the user. In this way, the user can record the videos according to personal preferences and requirements of the actual shooting scene, thereby further enhancing the shooting experience of the user.

Based on the foregoing embodiments, after step 1201 and/or step 1002, the video recording method provided in the embodiments of this application may further include:

displaying corresponding preset input prompt information in a position associated with each of the preset recording properties, where the preset input prompt information is used to indicate an input characteristic corresponding to a preset input, and the preset input is an input for controlling displaying of a display window corresponding to the preset recording property.

Correspondingly, step 1203 may specifically include:

obtaining an input characteristic corresponding to the fifth input; and in a case that the input characteristic is determined to match an input characteristic corresponding to a preset input for controlling displaying of a second display window corresponding to the second recording property, obtaining the second recording property.

In some examples, step 1004 may specifically include:

obtaining an input characteristic corresponding to the seventh input; and in a case that the input characteristic is determined to match an input characteristic corresponding to a preset input for controlling switching of the current recording property to the first recording property, obtaining the first recording property. In this case, the preset input may be an input used to control switching from the current recording property to the first recording property for the recording of the first video.

Herein, different preset recording properties may display different preset input prompt information correspondingly, so as to prompt the user how to call up a corresponding recording property for the video recording by using a shortcut operation, and control displaying of a display window for displaying a shooting preview screen of the video.

Figure 4B:
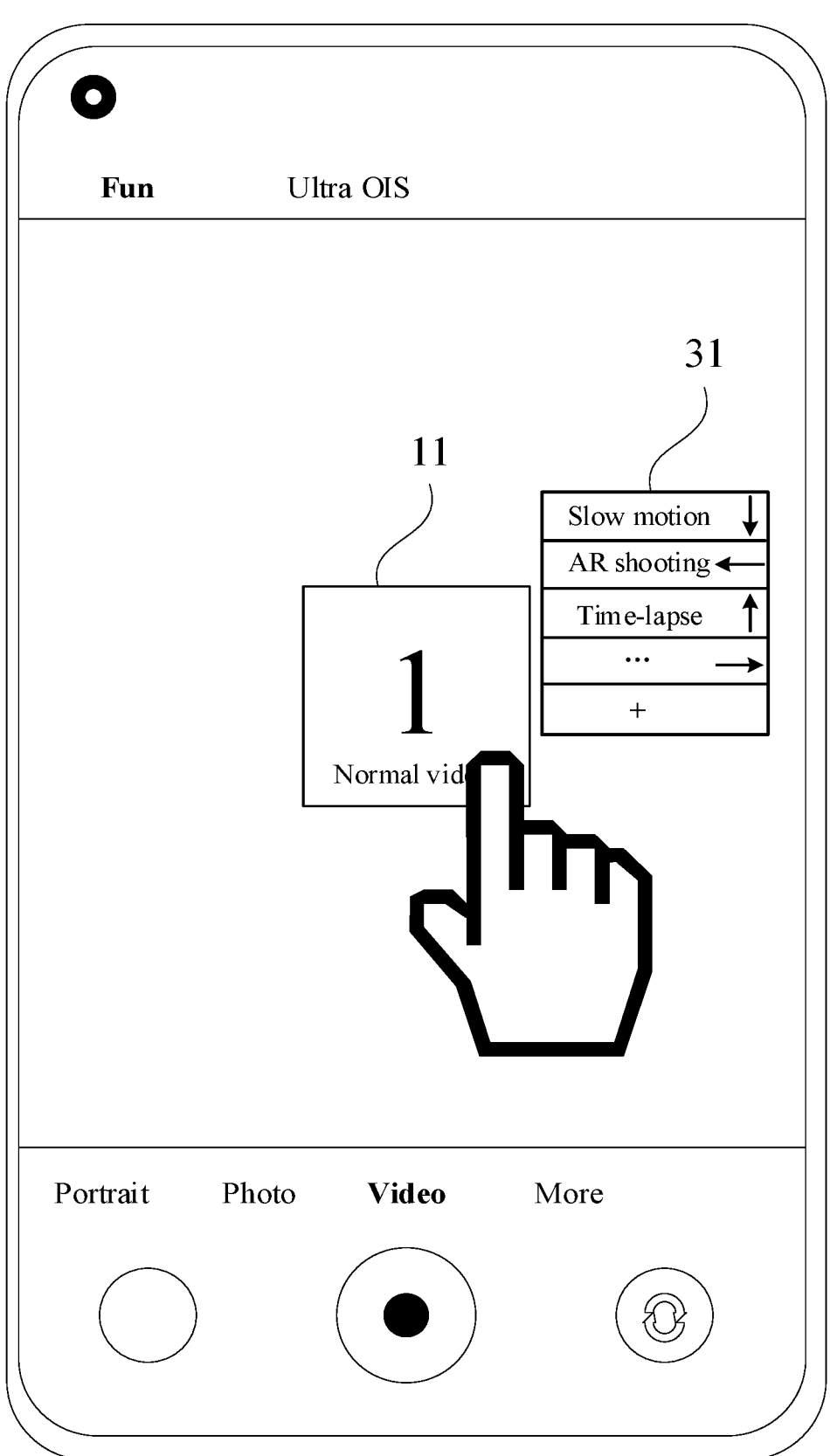
FIG. 4b is a schematic diagram of yet another video recording screen according to an exemplary embodiment.

For example, as shown in FIG. 4b, after the user touches and holds the first display window 11, the first menu list 31 is displayed on one side of the first display window 11. The list includes at least one preset recording property, and a corresponding indication arrow, that is, the preset input prompt information, is displayed on one side of each preset recording property. The user can perform a corresponding input operation according to the preset input prompt information. For example, the user performs a slide operation according to a direction of the indication arrow, so as to quickly call up a corresponding recording property for the video recording, and control displaying of a display window for displaying a shooting preview screen of the video.

In addition, after step 130, the above-mentioned video recording method may further specifically include:

in response to the fifth input, displaying a shooting preview screen corresponding to the second video in the second display window.

In this way, the user can quickly call up the corresponding recording property for the video recording through a shortcut, thereby improving the video recording effects, enhancing the shooting experience of the user.

In some implementations, the preset input may be a preset slide operation. Correspondingly, an input characteristic corresponding to the preset input may be a sliding direction relative to a target display window.

Herein, the preset slide operation from the target display window may be, for example, an upward sliding, a downward sliding, a leftward sliding, or a rightward sliding, where the sliding's start from the target display window.

Figure 4C:
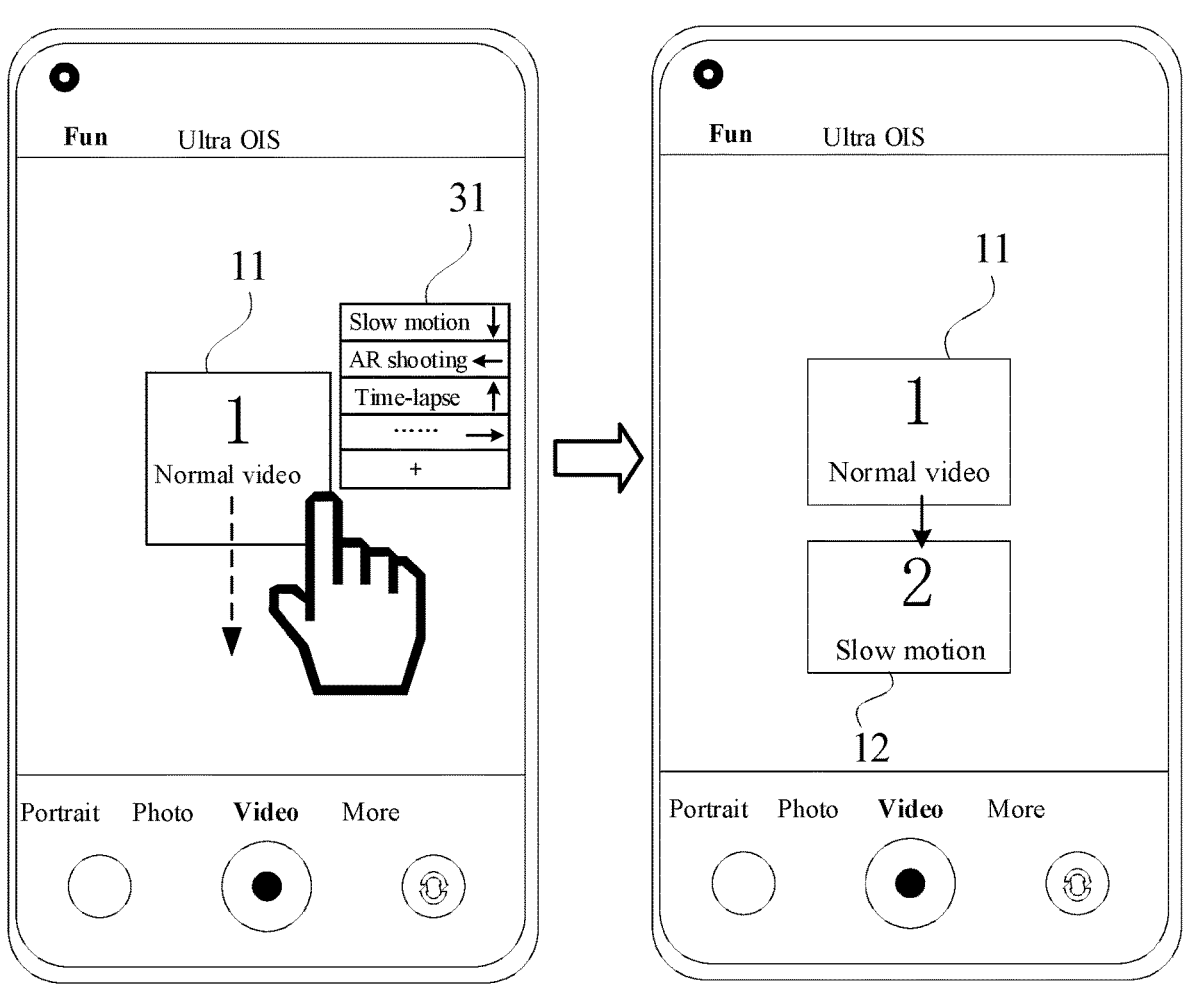
FIG. 4c is a schematic diagram of yet another video recording screen according to an exemplary embodiment.

For example, as shown in FIG. 4c, in a case that the first video is recorded in the normal video mode, if a moving object appears in the shooting scene and the user wants to switch to slow motion to capture the moving object, the user can directly touch and hold the first display window 11, and perform the operation of downward sliding from the first display window 11 according to a downward indication arrow corresponding to the slow motion in the indication arrows in the first menu list 31 popped-up. In this way, the second display window 12 can be generated automatically with the recording of the first video retained, and the shooting in the slow motion is performed at the same time to record the second video, with the corresponding shooting preview screen displayed in the second display window 12.

Figure 4D:
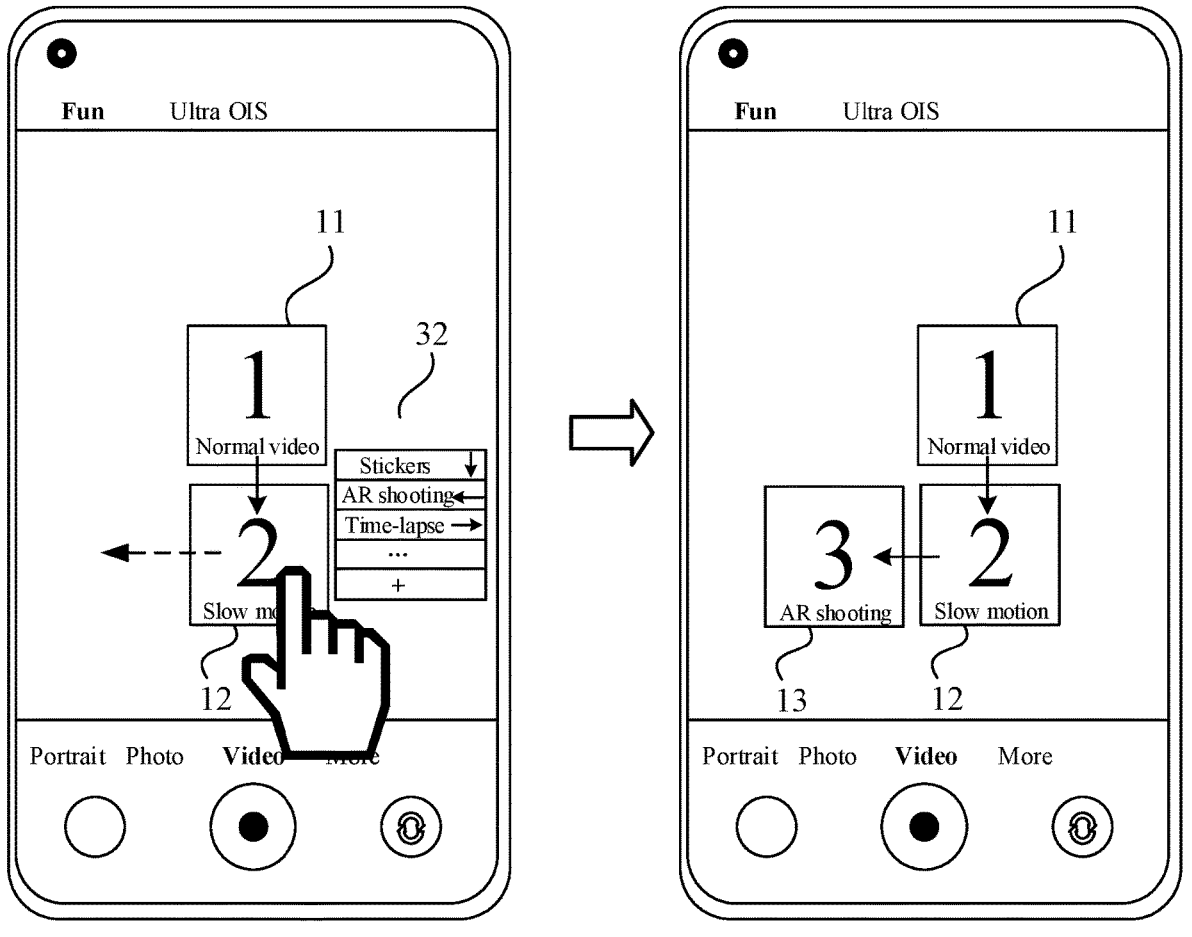
FIG. 4d is a schematic diagram of yet another video recording screen according to an exemplary embodiment.

Similarly, as shown in FIG. 4d, in a case that the user wants to switch to the AR shooting mode in the foregoing scenario, the user can continue to touch and hold the second display window 12, and perform the operation of leftward sliding from the second display window 12 according to an indication arrow in a second menu list 32. In this way, a third display window 13 can be generated automatically for AR shooting, and the first display window 11 and the second display window 12 continue with the video recording in the corresponding modes, and so on.

In this way, the user can quickly call up and use the corresponding recording properties for the video recording through simple slide operations, thereby further enhancing the shooting experience of the user.

In addition, after the displaying a shooting preview screen corresponding to the second video in the second display window, the video recording method provided in the embodiments of this application may further include:

obtaining an orientation of a first display window relative to the second display window;

determining a first direction according to the orientation; and in a case that the first direction is determined to be consistent with a target sliding direction, updating the target sliding direction to a direction different from the first direction, where the target sliding direction is a sliding direction of a preset slide operation for controlling displaying of a third display window corresponding to a third recording property.

Figure 4E:
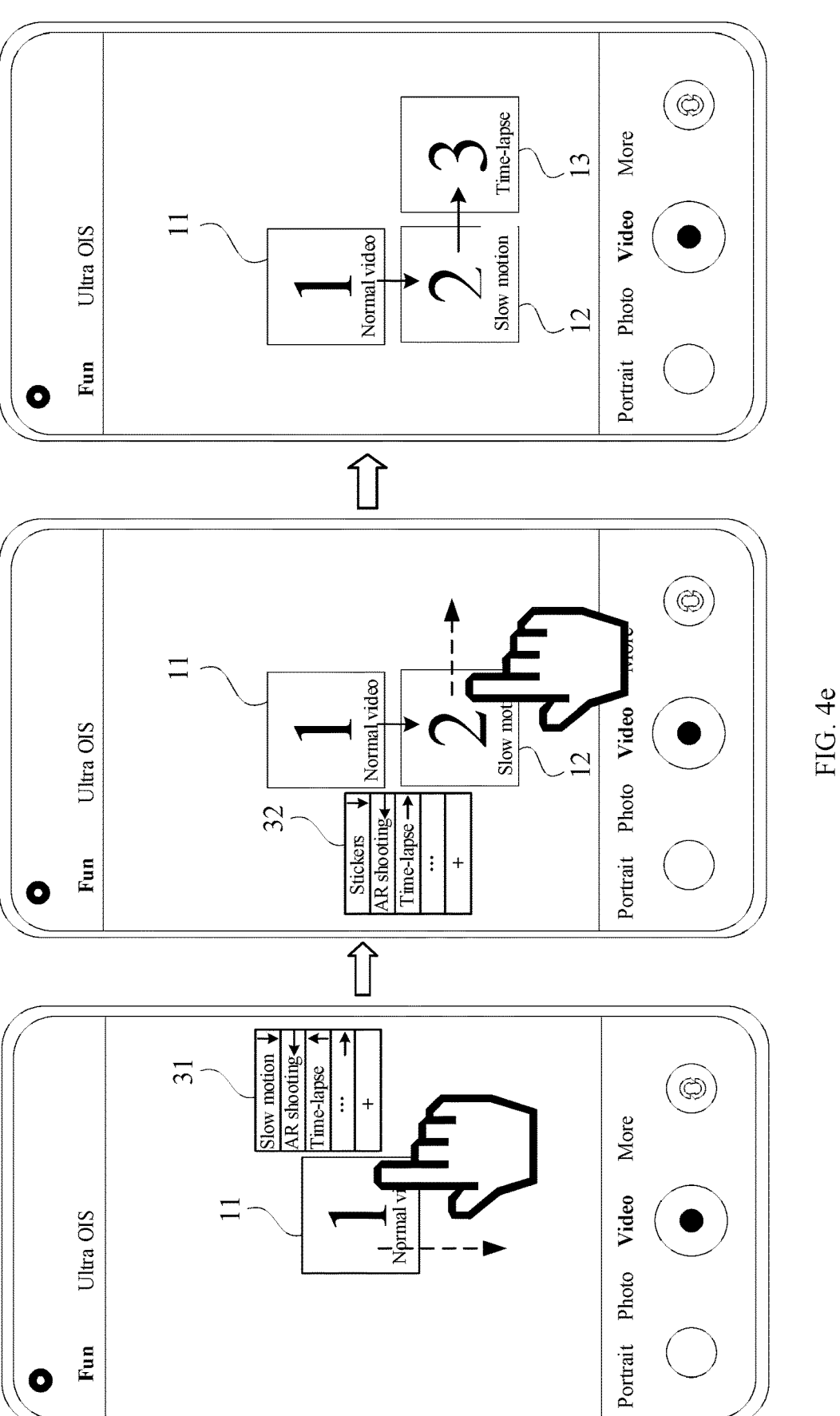
FIG. 4e is a schematic diagram of yet another video recording screen according to an exemplary embodiment.

For example, as shown in FIG. 4e, after the second display window 12 is called up, in a case that the arrows in the displayed second menu list 32 triggered by the user touching and holding the second display window 12 have completely the same directions as the arrows in the displayed first menu list 31 triggered by the user touching and holding the first display window 11, when the user wants to call up a time-lapse mode based on the second display window 12 to record a third video and trigger a third display window, the user needs to perform the operation of upward sliding. However, in this case, the user can find the presence of the first display window 11 above the second display window 12, so a display position of the third display window 13 collides with that of the first display window 11. Therefore, in the case of a collision, an indication direction of an arrow corresponding to the time-lapse mode in the second menu list 32 can be adjusted, for example, to be leftward.

Therefore, window positions around the latest display window displayed are detected in real time, so that when the position is consistent with a target sliding direction corresponding to an unused recording property, the target sliding direction can be adjusted in a timely manner to avoid collision, thereby improving the stability and reliability of the video recording process.

It should be noted that the video recording method provided in the embodiments of this application may be performed by a video recording apparatus or a control module for performing the video recording method in the video recording apparatus. In the embodiments of this application, the video recording method being performed by the video recording apparatus is used as an example to describe the video recording apparatus provided in the embodiments of this application.

FIG. 5 is a schematic structural diagram of a video recording apparatus according to an exemplary embodiment.

As shown in FIG. 5, the video recording apparatus 500 may specifically include:

a first receiving module 501 configured to receive, during recording of a first video based on a first recording property, a first input for a shooting preview screen corresponding to the first video;

a first obtaining module 502 configured to, in response to the first input, obtain a second recording property; and a recording response module 503 configured to record a second video based on the second recording property while retaining the recording of the first video based on the first recording property.

The following describes in detail the video recording apparatus 500 specifically as follows.

In some embodiments, the above-mentioned video recording apparatus 500 may further include:

an editing and splicing module 504 configured to, after the recording a second video based on the second recording property while retaining the recording of the first video based on the first recording property, edit at least one of the first video and the second video and perform video splicing based on an editing result to obtain a target video.

In some embodiments, the editing and splicing module 504 may specifically include a time obtaining submodule, a video editing submodule, and a video splicing submodule, where the time obtaining submodule is configured to obtain a recording start time point corresponding to the second video;

the video editing submodule is configured to edit, according to the recording start time point, the first video to obtain a target video clip, where the target video clip is a video clip in which the first video and the second video do not overlap in video recording time; and the video splicing submodule is configured to splice, according to a recording property application order, the target video clip with the second video to obtain the target video.

In some other embodiments, the editing and splicing module 504 may specifically include a first processing submodule, a second processing submodule, or a third processing submodule, where the first processing submodule is configured to: receive a second input for the first video; in response to the second input, edit the first video to obtain a first video clip; and splice, according to a recording property application order, the first video clip with the second video to obtain the target video; or the second processing submodule is configured to: receive a third input for the second video; in response to the third input, edit the second video to obtain a second video clip; and splice, according to a recording property application order, the first video with the second video clip to obtain the target video; or the third processing submodule is configured to: receive a second input for the first video and a third input for the second video; in response to the second input, edit the first video to obtain a first video clip, and in response to the third input, edit the second video to obtain a second video clip; and splice, according to a recording property application order, the first video clip with the second video clip to obtain the target video.

In some embodiments, the above-mentioned video recording apparatus 500 may further include:

a second receiving module 505 configured to, after the recording a second video based on the second recording property while retaining the recording of the first video based on the first recording property, receive a fourth input for a first display window corresponding to the first video;

a position exchange module 506 configured to, in response to the fourth input, adjust a relative positional relationship between the first display window corresponding to the first video and a display window corresponding to at least one related video, where the display window is used to display a shooting preview screen corresponding to the video; and an order updating module 507 configured to update the recording property application order based on an adjusting result.

In some embodiments, the above-mentioned first obtaining module 502 may specifically include a first displaying submodule, a third receiving submodule, and a response obtaining submodule, where the first displaying submodule is configured to, after the receiving a first input by a user for a shooting preview screen corresponding to the first video and before the recording a second video based on the second recording property, display at least one preset recording property, the preset recording property including the second recording property;

the third receiving submodule is configured to receive a fifth input by the user for the second recording property; and the response obtaining submodule is configured to, in response to the fifth input, obtain the second recording property.

In some embodiments, the above-mentioned video recording apparatus 500 may further include:

a fourth receiving module 508 configured to, before the receiving a first input for the first video, receive a sixth input;

a second displaying module 509 configured to, in response to the sixth input, display at least one preset recording property, the preset recording property including the first recording property;

a fifth receiving module 510 configured to receive a seventh input for the first recording property;

a second obtaining module 511 configured to, in response to the seventh input, obtain the first recording property; and a recording and displaying module 512 configured to record the first video based on the first recording property, and display the shooting preview screen corresponding to the first video in a first display window.

In some embodiments, the above-mentioned first obtaining module 502 may further specifically include:

an information prompt submodule configured to, after the displaying at least one preset recording property, display corresponding preset input prompt information in a position associated with each of the preset recording properties, where the preset input prompt information is used to indicate an input characteristic corresponding to a preset input, and the preset input is an input for controlling displaying of a display window corresponding to the preset recording property.

The above-mentioned response obtaining submodule may specifically include:

a characteristic matching unit configured to obtain an input characteristic corresponding to the fifth input; and a matching and obtaining unit configured to, in a case that the input characteristic is determined to match an input characteristic corresponding to a preset input for controlling displaying of a second display window corresponding to the second recording property, obtain the second recording property.

The above-mentioned video recording apparatus 500 may further specifically include:

a screen displaying module 513 configured to, after the recording a second video based on the second recording property while retaining the recording of the first video based on the first recording property, display a shooting preview screen corresponding to the second video in the second display window.

In some embodiments, in a case that the preset input is a preset slide operation, an input characteristic corresponding to the preset input is a sliding direction relative to a target display window.

In some embodiments, the above-mentioned video recording apparatus 500 may further include:

an orientation determining module 514 configured to, after the displaying a shooting preview screen corresponding to the second video in the second display window, obtain an orientation of a first display window relative to the second display window;

a direction determining module 515 configured to determine a first direction according to the orientation; and a direction updating module 516 configured to, in a case that the first direction is determined to be consistent with a target sliding direction, update the target sliding direction to a direction different from the first direction, where the target sliding direction is a sliding direction of a preset slide operation for controlling displaying of a third display window corresponding to a third recording property.

As such, the second video is recorded based on the second recording property during the recording of the first video based on the first recording property, so videos with different shooting effects can be obtained according to requirements of the user, thereby diversifying the video recording effects, providing the user with more choices. In addition, automatic switching of recording properties can be implemented by receiving the first input by the user for the first video with no need to end the video recording process, so every moment can be recorded, which enhances the shooting experience of the user while simplifying the switch operation.

The video recording apparatus in this embodiment of this application may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like, and the non-mobile electronic device may be a network attached storage (NAS), a personal computer (PC), a television (TV), a teller machine, a self-service machine, or the like. This is not specifically limited in this embodiment of this application.

The video recording apparatus in this embodiment of this application may be an apparatus with an operating system. The operating system may be an Android operating system, an iOS operating system, or another possible operating system, which is not specifically limited in this embodiment of this application.

The video recording apparatus provided in this embodiment of this application can implement the processes implemented in the method embodiments shown in FIG. 1*a* to FIG. 4*c*. To avoid repetition, details are not described herein again.

Figure 6:
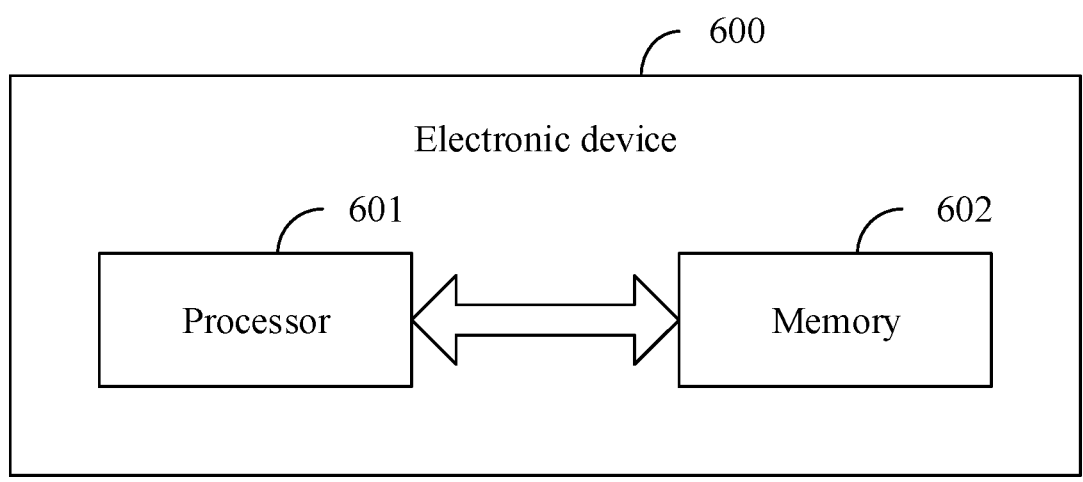
FIG. 6 is a structural block diagram of an electronic device according to an exemplary embodiment.

In addition, as shown in FIG. 6, an embodiment of this application further provides an electronic device 600, including a processor 601, a memory 602, and a program or instructions stored in the memory 602 and capable of running on the processor 601. When the program or instructions are executed by the processor 601, the processes of the foregoing embodiments of the video recording method are implemented, with the same technical effects achieved. To avoid repetition, details are not described herein again.

It should be noted that the electronic device in this embodiment of this application includes the foregoing mobile electronic device and non-mobile electronic device.

Figure 7:
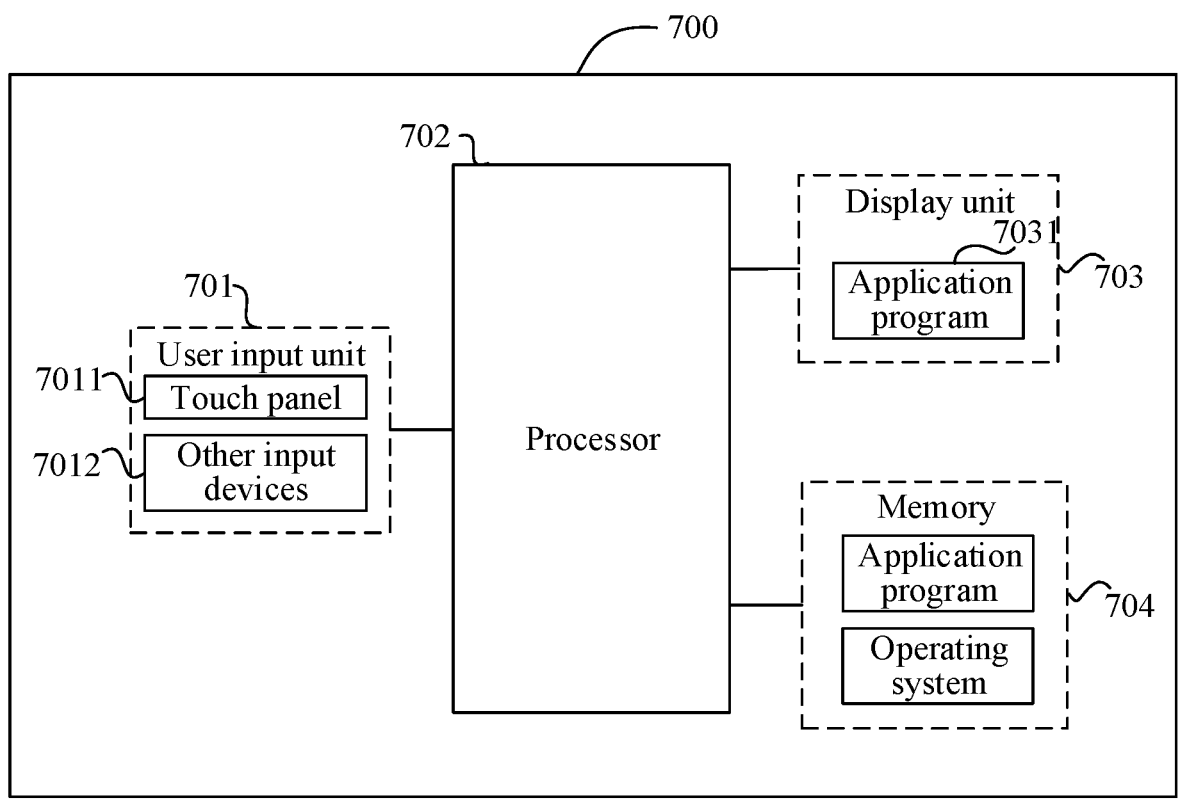
FIG. 7 is a schematic diagram of a hardware structure of an electronic device for implementing embodiments of this application.

FIG. 7 is a schematic diagram of a hardware structure of an electronic device for implementing the embodiments of this application.

The electronic device 700 includes but is not limited to components such as a user input unit 701, a processor 702, a display unit 703, and a memory 704.

Persons skilled in the art can understand that the electronic device 700 may further include a power supply (for example, battery) for supplying power to the components. The power supply may be logically connected to the processor 702 via a power management system, so that functions such as charge management, discharge management, and power consumption management are implemented via the power management system. The structure of the electronic device shown in FIG. 7 does not constitute any limitation on the electronic device. The electronic device may include more or fewer components than shown in the figure, or combine some of the components, or arrange the components differently. Details are not described herein.

In some examples, the user input unit 701 is configured to receive, during recording of a first video based on a first recording property, a first input for a shooting preview screen corresponding to the first video; and the processor 702 is configured to: in response to the first input, obtain a second recording property; and record a second video based on the second recording property while retaining the recording of the first video based on the first recording property.

As such, the second video is recorded based on the second recording property during the recording of the first video based on the first recording property, so videos with different shooting effects can be obtained according to requirements of the user, thereby diversifying the video recording effects, providing the user with more choices. In addition, automatic switching of recording properties can be implemented by receiving the first input by the user for the first video with no need to end the video recording process, so every moment can be recorded, which enhances the shooting experience of the user while simplifying the switch operation.

In some examples, the processor 702 is further configured to edit at least one of the first video and the second video and perform video splicing based on an editing result to obtain a target video.

In some examples, the processor 702 is further configured to: obtain a recording start time point corresponding to the second video; edit, according to the recording start time point, the first video to obtain a target video clip, where the target video clip is a video clip in which the first video and the second video do not overlap in video recording time; and splice, according to a recording property application order, the target video clip with the second video to obtain the target video.

In some examples, the user input unit 701 is further configured to receive a second input for the first video; and
the processor 702 is further configured to: in response to the second input, edit the first video to obtain a first video clip; and splice, according to a recording property application order, the first video clip with the second video to obtain the target video; or
the user input unit 701 is further configured to receive a third input for the second video; and
the processor 702 is further configured to: in response to the third input, edit the second video to obtain a second video clip; and splice, according to a recording property application order, the first video with the second video clip to obtain the target video; or
the user input unit 701 is further configured to receive a second input for the first video and a third input for the second video; and
the processor 702 is further configured to: in response to the second input, edit the first video to obtain a first video clip, and in response to the third input, edit the second video to obtain a second video clip; and splice, according to a recording property application order, the first video clip with the second video clip to obtain the target video.

In some examples, the user input unit 701 is further configured to receive a fourth input for a first display window corresponding to the first video; and
the processor 702 is further configured to: in response to the fourth input, adjust a relative positional relationship between the first display window corresponding to the first video and a display window corresponding to at least one related video, where the display window is used to display a shooting preview screen corresponding to the video; and update the recording property application order based on an adjusting result.

In some examples, the display unit 703 is configured to display at least one preset recording property, the preset recording property including the second recording property;
the user input unit 701 is further configured to receive a fifth input for the second recording property; and
the processor 702 is further configured to, in response to the fifth input, obtain the second recording property.

In some examples, the user input unit 701 is further configured to receive a sixth input;
the display unit 703 is further configured to, in response to the sixth input, display at least one preset recording property, the preset recording property including the first recording property;
the user input unit 701 is further configured to receive a seventh input for the first recording property;
the processor 702 is further configured to: in response to the seventh input, obtain the first recording property; and record the first video based on the first recording property; and
the display unit 703 is further configured to display the shooting preview screen corresponding to the first video in a first display window.

In some examples, the display unit 703 is further configured to display corresponding preset input prompt information in a position associated with each of the preset recording properties, where the preset input prompt information is used to indicate an input characteristic corresponding to a preset input, and the preset input is an input for controlling displaying of a display window corresponding to the preset recording property;
the processor 702 is further configured to: obtain an input characteristic corresponding to the fifth input; and in a case that the input characteristic is determined to match an input characteristic corresponding to a preset input for controlling displaying of a second display window corresponding to the second recording property, obtain the second recording property; and
the display unit 703 is further configured to display a shooting preview screen corresponding to the second video in the second display window.

In some examples, the processor 702 is further configured to: obtain an orientation of a first display window relative to the second display window; determine a first direction according to the orientation; and in a case that the first direction is determined to be consistent with a target sliding direction, update the target sliding direction to a direction different from the first direction, where the target sliding direction is a sliding direction of a preset slide operation for controlling displaying of a third display window corresponding to a third recording property.

Therefore, new recording properties are constantly called up and the video recording is performed under different recording properties, so that shooting results with different effects can be obtained at the same time. Then, a plurality of videos with different recording effects are edited and spliced, so as to not only conveniently and quickly guide the user to find and use more recording properties and enrich the video recording effects, but also reduce the later processing time of the user and improve the diversity and fun of video recording. In addition, video recording with different effects for a same shooting scene also provides more choices for the user, thereby enhancing the shooting experience of the user.

It should be understood that in this embodiment of this application, the display unit 703 may include a display panel 7031, and the display panel 7031 may be configured in a form of a liquid crystal display, an organic light-emitting diode display, or the like. The user input unit 701 includes a touch panel 7011 and other input devices 7012. The touch panel 7011 is also referred to as a touchscreen. The touch panel 7011 may include two parts: a touch detection apparatus and a touch controller. The other input devices 7012 may include but are not limited to a physical keyboard, a functional button (such as a volume control button or a power on/off button), a trackball, a mouse, and a joystick. Details are not described herein. The memory 704 may be configured to store a software program and various data which include but are not limited to an application program and an operating system. The processor 702 may integrate an application processor and a modem processor. The application processor mainly processes an operating system, a user interface, an application program, and the like. The modem processor mainly processes wireless communication. It can be understood that the modem processor may alternatively be not integrated in the processor 702.

An embodiment of this application further provides a readable storage medium, where the readable storage medium stores a program or instructions, and when the program or instructions are executed by a processor, the processes of the foregoing embodiments of the video recording method are implemented, with the same technical effects achieved. To avoid repetition, details are not described herein again.

In some examples, the processor is a processor in the electronic device in the foregoing embodiment. Examples of the readable storage medium include a non-transitory computer-readable storage medium such as a computer read-only memory (ROM), a random access memory (RAM), a magnetic disk, or an optical disc.

An embodiment of this application provides an electronic device, configured to implement the processes of the foregoing embodiments of the video recording method, with the same technical effects achieved. To avoid repetition, details are not described herein again.

An embodiment of this application provides a computer program product, and the program product can be executed by a processor to implement the processes of the foregoing embodiments of the video recording method, with the same technical effects achieved. To avoid repetition, details are not described herein again.

An embodiment of this application further provides a chip. The chip includes a processor and a communication interface, where the communication interface is coupled to the processor, and the processor is configured to run a program or instructions to implement the processes of the foregoing embodiments of the video recording method, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that in this specification, the terms "include", "comprise", or any of their variants are intended to cover a non-exclusive inclusion, such that a process, method, article, or apparatus that includes a series of elements not only includes those elements but also includes other elements that are not expressly listed, or further includes elements inherent to such process, method, article, or apparatus. Without more restrictions, an element preceded by the statement "includes a . . . " does not preclude the presence of other identical elements in the process, method, article, or apparatus that includes the element. In addition, it should be noted that the scope of the method and apparatus in the implementations of this application is not limited to functions being performed in the order shown or discussed, but may further include functions being performed at substantially the same time or in a reverse order, depending on the functions involved. For example, the described method may be performed in an order different from the order described, and steps may be added, omitted, or combined. In addition, features described with reference to some examples may be combined in other examples.

From the foregoing description of the implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such understanding, the technical solutions of this application essentially or the part thereof that contributes to the prior art may be implemented in a form of a software product. The computer software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms which do not depart from the essence of this application and the protection scope of the claims, and all such forms shall fall within the protection scope of this application.

What is claimed is:

1. A video recording method, comprising:
   receiving, during recording of a first video based on a first recording property, a first input for a shooting preview screen corresponding to the first video;
   in response to the first input, obtaining a second recording property; and
   recording a second video based on the second recording property while retaining the recording of the first video based on the first recording property;
   wherein after the recording a second video based on the second recording property while retaining the recording of the first video based on the first recording property, the method further comprises:

editing at least one of the first video and the second video and performing video splicing based on an editing result to obtain a target video;

wherein after the recording a second video based on the second recording property while retaining the recording of the first video based on the first recording property, the method further comprises:

receiving a fourth input for a first display window corresponding to the first video;

in response to the fourth input, adjusting a relative positional relationship between the first display window corresponding to the first video and a display window corresponding to at least one related video, wherein the display window is used to display a shooting preview screen corresponding to the video; and updating the recording property application order based on an adjusting result.

2. The method according to claim 1, wherein the editing at least one of the first video and the second video and performing video splicing based on an editing result to obtain a target video comprises:

obtaining a recording start time point corresponding to the second video;

editing, according to the recording start time point, the first video to obtain a target video clip, wherein the target video clip is a video clip in which the first video and the second video do not overlap in video recording time; and splicing, according to a recording property application order, the target video clip with the second video to obtain the target video.

3. The method according to claim 1, wherein the editing at least one of the first video and the second video and performing video splicing based on an editing result to obtain a target video comprises:

receiving a second input for the first video; in response to the second input, editing the first video to obtain a first video clip; and splicing, according to a recording property application order, the first video clip with the second video to obtain the target video; or receiving a third input for the second video; in response to the third input, editing the second video to obtain a second video clip; and splicing, according to a recording property application order, the first video with the second video clip to obtain the target video; or receiving a second input for the first video and a third input for the second video; in response to the second input, editing the first video to obtain a first video clip, and in response to the third input, editing the second video to obtain a second video clip; and splicing, according to a recording property application order, the first video clip with the second video clip to obtain the target video.

4. The method according to claim 1, wherein the obtaining a second recording property comprises:

displaying at least one preset recording property, the preset recording property comprising the second recording property;

receiving a fifth input for the second recording property; and in response to the fifth input, obtaining the second recording property.

5. The method according to claim 1, wherein before the receiving a first input for a shooting preview screen corresponding to the first video, the method further comprises:

receiving a sixth input;

in response to the sixth input, displaying at least one preset recording property, the preset recording property comprising the first recording property;

receiving a seventh input for the first recording property;

in response to the seventh input, obtaining the first recording property; and recording the first video based on the first recording property, and displaying the shooting preview screen corresponding to the first video in a first display window.

6. The method according to claim 4, wherein after the displaying at least one preset recording property, the method further comprises:

displaying corresponding preset input prompt information in a position associated with each of the preset recording properties, wherein the preset input prompt information is used to indicate an input characteristic corresponding to a preset input, and the preset input is an input for controlling displaying of a display window corresponding to the preset recording property;

the in response to the fifth input, obtaining the second recording property comprises:

obtaining an input characteristic corresponding to the fifth input; and in a case that the input characteristic is determined to match an input characteristic corresponding to a preset input for controlling displaying of a second display window corresponding to the second recording property, obtaining the second recording property; and after the recording a second video based on the second recording property while retaining the recording of the first video based on the first recording property, the method further comprises:

displaying a shooting preview screen corresponding to the second video in the second display window.

7. The method according to claim 6, wherein in a case that the preset input is a preset slide operation, an input characteristic corresponding to the preset input is a sliding direction relative to a target display window.

8. The method according to claim 7, wherein after the displaying a shooting preview screen corresponding to the second video in the second display window, the method further comprises:

obtaining an orientation of a first display window relative to the second display window;

determining a first direction according to the orientation; and in a case that the first direction is determined to be consistent with a target sliding direction, updating the target sliding direction to a direction different from the first direction, wherein the target sliding direction is a sliding direction of a preset slide operation for controlling displaying of a third display window corresponding to a third recording property.

9. An electronic device, comprising a processor, a memory, and a program or instructions stored in the memory and capable of running on the processor, wherein the program or instructions, when executed by the processor, causes the processor to implement the following steps:

receiving, during recording of a first video based on a first recording property, a first input for a shooting preview screen corresponding to the first video;

in response to the first input, obtaining a second recording property; and recording a second video based on the second recording property while retaining the recording of the first video based on the first recording property;

wherein after the recording a second video based on the second recording property while retaining the recording of the first video based on the first recording property, the processor is configured to edit at least one of the first video and the second video and performing video splicing based on an editing result to obtain a target video;

wherein the processor is configured to: after the recording a second video based on the second recording property while retaining the recording of the first video based on the first recording property, perform the following steps:

receiving a fourth input for a first display window corresponding to the first video;

in response to the fourth input, adjusting a relative positional relationship between the first display window corresponding to the first video and a display window corresponding to at least one related video, wherein the display window is used to display a shooting preview screen corresponding to the video; and updating the recording property application order based on an adjusting result.

10. The electronic device according to claim 9, wherein in editing at least one of the first video and the second video and performing video splicing based on an editing result to obtain a target video, the processor is specifically configured to:

obtain a recording start time point corresponding to the second video;

edit, according to the recording start time point, the first video to obtain a target video clip, wherein the target video clip is a video clip in which the first video and the second video do not overlap in video recording time; and splice, according to a recording property application order, the target video clip with the second video to obtain the target video.

11. The electronic device according to claim 9, wherein in editing at least one of the first video and the second video and performing video splicing based on an editing result to obtain a target video, the processor is specifically configured to:

receive a second input for the first video; in response to the second input, editing the first video to obtain a first video clip; and splicing, according to a recording property application order, the first video clip with the second video to obtain the target video; or receive a third input for the second video; in response to the third input, editing the second video to obtain a second video clip; and splicing, according to a recording property application order, the first video with the second video clip to obtain the target video; or receive a second input for the first video and a third input for the second video; in response to the second input, editing the first video to obtain a first video clip, and in response to the third input, editing the second video to obtain a second video clip; and splicing, according to a recording property application order, the first video clip with the second video clip to obtain the target video.

12. The electronic device according to claim 9, wherein in obtaining a second recording property, the processor is specifically configured to:

display at least one preset recording property, the preset recording property comprising the second recording property;

receive a fifth input for the second recording property; and in response to the fifth input, obtain the second recording property.

13. The electronic device according to claim 9, wherein the processor is configured to: before the receiving a first input for a shooting preview screen corresponding to the first video, perform the following steps:

receiving a sixth input;

in response to the sixth input, displaying at least one preset recording property, the preset recording property comprising the first recording property;

receiving a seventh input for the first recording property;

in response to the seventh input, obtaining the first recording property; and recording the first video based on the first recording property, and displaying the shooting preview screen corresponding to the first video in a first display window.

14. The electronic device according to claim 12, wherein after the displaying at least one preset recording property, the processor is configured to display corresponding preset input prompt information in a position associated with each of the preset recording properties, wherein the preset input prompt information is used to indicate an input characteristic corresponding to a preset input, and the preset input is an input for controlling displaying of a display window corresponding to the preset recording property;

the in response to the fifth input, obtaining the second recording property comprises:

obtaining an input characteristic corresponding to the fifth input; and in a case that the input characteristic is determined to match an input characteristic corresponding to a preset input for controlling displaying of a second display window corresponding to the second recording property, obtaining the second recording property; and after the recording a second video based on the second recording property while retaining the recording of the first video based on the first recording property, the processor is configured to display a shooting preview screen corresponding to the second video in the second display window.

15. The electronic device according to claim 14, wherein in a case that the preset input is a preset slide operation, an input characteristic corresponding to the preset input is a sliding direction relative to a target display window, wherein the processor is configured to: after the displaying a shooting preview screen corresponding to the second video in the second display window, perform the following steps:

obtaining an orientation of a first display window relative to the second display window;

determining a first direction according to the orientation; and in a case that the first direction is determined to be consistent with a target sliding direction, updating the target sliding direction to a direction different from the first direction, wherein the target sliding direction is a sliding direction of a preset slide operation for controlling displaying of a third display window corresponding to a third recording property.

16. A non-transitory readable storage medium, wherein the readable storage medium stores a program or instructions, and the program or instructions, when executed by a processor, causes the processor to implement the following steps:

receiving, during recording of a first video based on a first recording property, a first input for a shooting preview screen corresponding to the first video;

in response to the first input, obtaining a second recording property; and recording a second video based on the second recording property while retaining the recording of the first video based on the first recording property;

wherein after the recording a second video based on the second recording property while retaining the recording of the first video based on the first recording property, editing at least one of the first video and the second video and performing video splicing based on an editing result to obtain a target video;

wherein after the recording a second video based on the second recording property while retaining the recording of the first video based on the first recording property, receiving a fourth input for a first display window corresponding to the first video;

in response to the fourth input, adjusting a relative positional relationship between the first display window corresponding to the first video and a display window corresponding to at least one related video, wherein the display window is used to display a shooting preview screen corresponding to the video; and updating the recording property application order based on an adjusting result.

* * * * *